United States Patent
Zafar

(10) Patent No.: US 12,038,865 B2
(45) Date of Patent: Jul. 16, 2024

(54) DYNAMIC PROCESSING MEMORY CORE ON A SINGLE MEMORY CHIP

(71) Applicant: X-Silicon, Inc., Encinitas, CA (US)

(72) Inventor: Atif Zafar, Carmel, IN (US)

(73) Assignee: X-Silicon, Inc., Encinitas, CA (US)

( * ) Notice: Subject to any disclaimer, the term of this patent is extended or adjusted under 35 U.S.C. 154(b) by 0 days.

(21) Appl. No.: 18/201,293

(22) Filed: May 24, 2023

(65) Prior Publication Data
US 2023/0297287 A1    Sep. 21, 2023

Related U.S. Application Data

(63) Continuation of application No. 17/282,608, filed as application No. PCT/IB2019/001278 on Oct. 4, 2019.

(60) Provisional application No. 62/741,088, filed on Oct. 4, 2018.

(51) Int. Cl.
G06F 15/78     (2006.01)
G06F 15/80     (2006.01)

(52) U.S. Cl.
CPC ...... G06F 15/7821 (2013.01); G06F 15/7842 (2013.01); *G06F 15/8061* (2013.01)

(58) Field of Classification Search
CPC ............. G06F 15/7821; G06F 15/7842; G06F 15/8061
See application file for complete search history.

(56) References Cited

U.S. PATENT DOCUMENTS

| | | | |
|---|---|---|---|
| 9,432,298 B1 | 8/2016 | Smith | |
| 10,416,896 B2 * | 9/2019 | O | G06F 3/0659 |
| 10,592,467 B2 * | 3/2020 | Ryu | G06F 15/785 |
| 2004/0164992 A1 * | 8/2004 | Gangnet | G06T 11/001 345/591 |

(Continued)

OTHER PUBLICATIONS

International Search Report; International Searching Authority; International Patent Application No. PCT/IB2019/001278; Jul. 28, 2020; 2 pages.

(Continued)

*Primary Examiner* — Courtney P Spann
(74) *Attorney, Agent, or Firm* — Taft Stettinius & Hollister LLP

(57) ABSTRACT

Embodiments of the present invention provide a method for incorporating a dynamic processing memory core into a single memory chip to enable computational processing and memory storage from the single memory chip. The method includes storing data elements by memory storage devices positioned on the single memory chip. The method also includes executing, by a processing devices positioned on the single memory chip, memory instructions. The method also includes transitioning the dynamic memory processing core from a memory storage device to a processing device by instructing the processing device to execute the memory instructions. The method also includes transitioning the dynamic processing memory core from the processing device to the memory storage device by instructing the processing device to not execute the memory instructions thereby terminating the computational processing of the dynamic processing memory core and maintaining the memory storage provided by the memory storage device.

20 Claims, 5 Drawing Sheets

(56) References Cited

U.S. PATENT DOCUMENTS

| | | |
|---|---|---|
| 2010/0079600 A1 | 4/2010 | Silverbrook |
| 2015/0106574 A1* | 4/2015 | Jayasena ............. G06F 15/7821 |
| | | 711/154 |
| 2015/0185797 A1* | 7/2015 | Cooper ................. G06F 1/3275 |
| | | 713/340 |
| 2016/0248631 A1 | 8/2016 | Duchesneau |
| 2016/0266902 A1* | 9/2016 | Corbal ................ G06F 9/30007 |
| 2018/0053545 A1* | 2/2018 | Son ......................... G11C 7/08 |
| 2018/0211697 A1 | 7/2018 | Teh |

OTHER PUBLICATIONS

Written Opinion of the International Searching Authority; International Searching Authority; International Patent Application No. PCT/IB2019/001278; Jul. 28, 2020; 16 pages.

\* cited by examiner

DYNAMIC PROCESSING MEMORY CORE ON A SINGLE MEMORY CHIP

CROSS-REFERENCE TO RELATED APPLICATIONS

This application is a continuation of U.S. patent application Ser. No. 17/282,608 filed on Apr. 2, 2021, which is a U.S. National Phase Application of International Patent Application No. PCT/IB2019/001278, which was filed on Oct. 4, 2019, and which claims the benefit of, and priority to, U.S. Provisional Application No. 62/741,088, which was filed on Oct. 4, 2018. The contents of each application are incorporated herein by reference in their entirety.

BACKGROUND

Field of the Invention

The present invention generally relates to computing systems. More particularly, the present invention is directed to architecture and methods for providing computational processing and memory storage on a single memory chip.

Related Art

Moore's Law is the observation that the quantity of transistors included in integrated circuits grows significantly as time progresses. Essentially, Moore's Law indicates that the size of transistors continues to decrease as time progresses thereby enabling significant growth in the quantity of transistors in integrated circuits as time progresses. However, in the last couple of years, Moore's law has slowed significantly in that the decrease in size of transistors has plateaued thereby significantly slowing the growth in the quantity of transistors on integrated circuits. In response to the plateauing of the decrease in transistor size, the processor industry has compensated by increasing the quantity of conventional processors positioned on a conventional chip in order to continue to improve processing.

In increasing the quantity of conventional processors positioned on a conventional chip to continue to improve the processing capabilities of the conventional chip, the conventional processors still have to access conventional memory to be able to execute any computations. In increasing the quantity of conventional processors positioned on a chip, the processor industry is also increasing the quantity of conventional memory access technologies, such as conventional caches, positioned on the conventional chip. In doing so, a greater portion of die space for the conventional chip is devoted to conventional memory access technologies.

In conventional approaches, the conventional processors interact with conventional memory positioned off-chip. In doing so, the overall performance of the conventional processor system slows as the data is transferred between the conventional processors and the conventional memory positioned off-chip from the conventional processors. Further, the amount of power consumed by the conventional processor system increases by transferring the data off-chip as well as the cost of the conventional processor system increases.

The incorporation of a conventional Graphics Processing Unit (GPU) into the conventional processor system further increases the amount of power consumed by the conventional processor system as well as the cost. The conventional GPU is limited to rendering each object into triangles in creating the graphical image for display. Regardless of the shape of the object to be displayed, the conventional GPU renders the object into triangles via the hardware incorporated into the conventional GPU. The hardware as well as the conventional GPU being positioned off-chip significantly increases the power consumed by the conventional processor system as well as the cost of the conventional processor system.

The answer to the plateauing of Moore's Law by the processor industry as well as the increased reliance on conventional GPUs has resulted in a significant increase in the power consumed by conventional processor systems as well as an increase in cost. In doing so, the conventional memory continues to be maintained off-chip from the conventional processors thereby having an impact on the performance of the conventional processor systems.

BRIEF SUMMARY

What is needed, therefore, is a method and a system for incorporating a dynamic processing memory core onto a single memory chip to enable computational processing and memory storage from the single memory chip.

In an embodiment, a system incorporates a dynamic processing memory core onto a single memory chip to enable computational processing and memory storage from the single memory chip. The system includes at least one memory storage device that is included in the dynamic processing memory core and is positioned on the single memory chip and is configured to store a plurality of data elements with each data element stored at a memory location associated with the at least one memory storage device positioned on the single memory chip. The system also includes at least one processing device that is included in the dynamic processing memory core and is positioned on the single memory chip and is configured to execute a plurality of memory instructions with each memory instruction associated with corresponding data elements that are stored in corresponding memory locations associated with the at least one memory storage device. The system also includes a configurable processor controller that is configured to transition the dynamic processing memory core from a memory storage device to a processing device by instructing the at least one processing device to execute at least one memory instruction that the at least one processing device is to execute based on the memory location of the data elements that are associated with the at least one memory storage device. The configurable processor controller is also configured to transition the dynamic processing memory core from the processing device to the memory storage device by instructing the at least one processing device to not execute the memory instructions thereby terminating the computational processing of the dynamic processing memory core and maintaining the memory storage provided by the at least one memory storage device.

In an embodiment, a method incorporates a dynamic processing memory core into a single memory chip to enable computational processing and memory storage from the single memory chip. A plurality of data elements may be stored with each data element stored at a memory location associated with at least one memory storage device positioned on the single memory chip. The at least one memory storage device is included in the dynamic processing memory core and is positioned on the single memory chip. A plurality of memory instructions is executed by at least one processing device with each memory instruction associated with corresponding data elements that are stored in corresponding memory locations associated with the at least one memory storage device. The at least one processing device is included in the dynamic processing memory core and is positioned on the single memory chip. The dynamic processing memory core may be transitioned by a configurable processor controller from a memory storage device to a processing device by instructing the at least one processing device to execute at least one memory instruction that the at least one processing device is to execute based on the memory location of the data elements that are associated with the at least one memory storage device. The dynamic processing memory core may be transitioned from the processing device to the memory storage device by instructing the at least one processing device to not execute the memory instructions thereby terminating the computational processing of the dynamic processing memory core and maintaining the memory storage provided by the at least one memory storage device.

In an embodiment, a system enables computational processing and memory storage to be executed from a single memory chip. A plurality of dynamic processing memory cores is positioned on the single memory chip and configured to store a plurality of data elements in a plurality of memory storage devices included in the dynamic processing memory cores and execute a plurality of memory instructions by a plurality of processing devices included in the dynamic processing memory cores. A plurality of configurable processor controllers is configured to instruct each dynamic processing core to operate as a memory storage device or a processing device by instructing dynamic processing memory cores to operate as processing devices to execute corresponding memory instructions thereby transitioning the selected dynamic memory cores into processing devices or by instructing dynamic processing memory cores selected to operate as memory storage devices to refrain from executing memory instructions thereby maintaining the memory storage of the selected dynamic processing memory cores.

Additional features and advantages of the present invention, as well as the structure and operation of various embodiments of the present invention, are described in detail below with reference to the accompanying drawings. It is noted that the present invention is not limited to the specific embodiments described herein. Such embodiments are presented herein for illustrational purposes only. Additional embodiments will be apparent to those skilled in the relevant art(s) based on the teachings combined herein.

BRIEF DESCRIPTION OF THE DRAWINGS/FIGURES

The accompanying drawings, which are incorporated herein and form part of the specification, illustrate the present invention and, together with the description, further serve to explain the principles of the present invention and to enable a person skilled in the pertinent art to make and use the present invention. Various embodiments of the present invention are described below with reference to the drawings, wherein like reference numerals are used to refer to like elements throughout.

Figure 4:
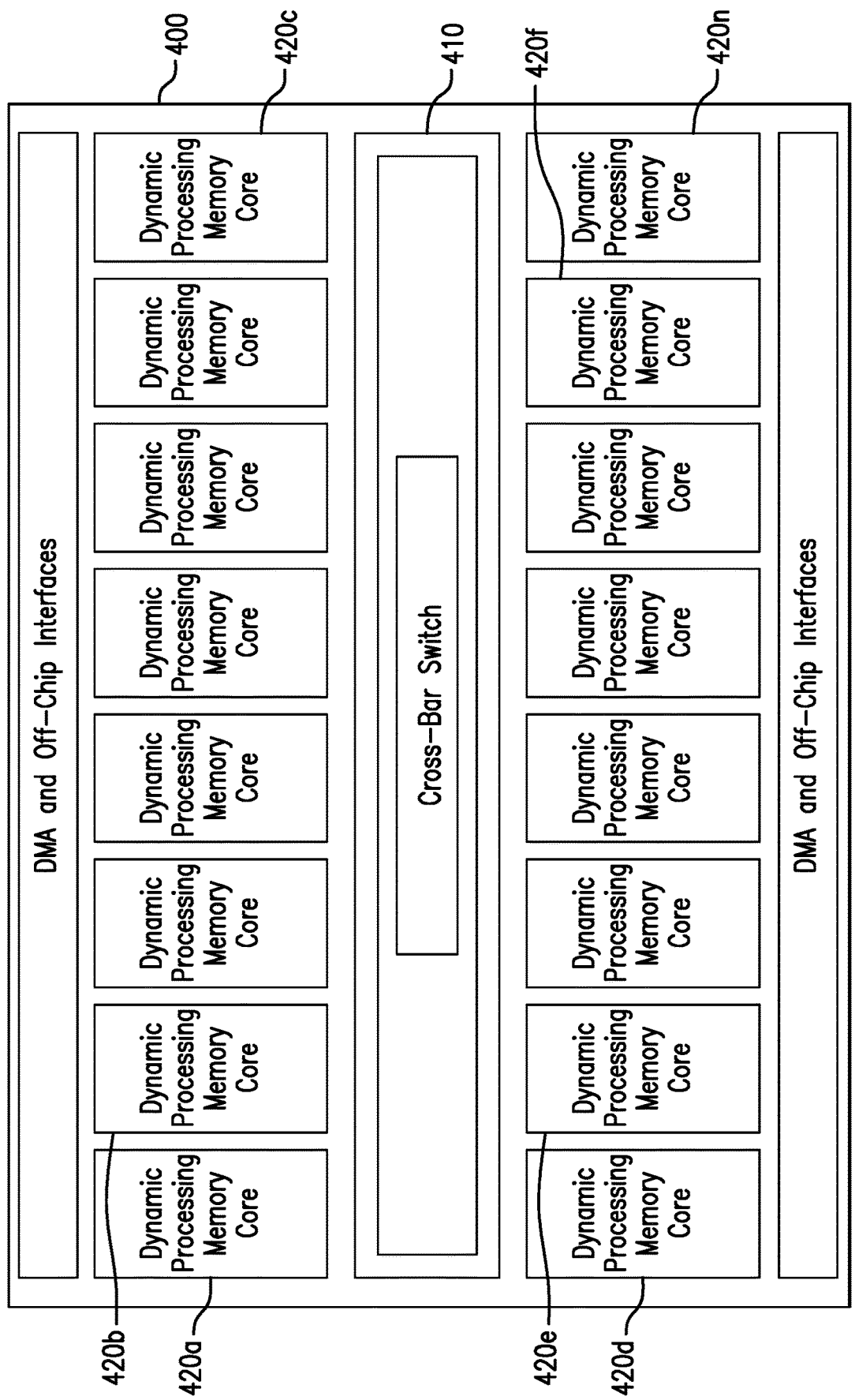
Figure 5:
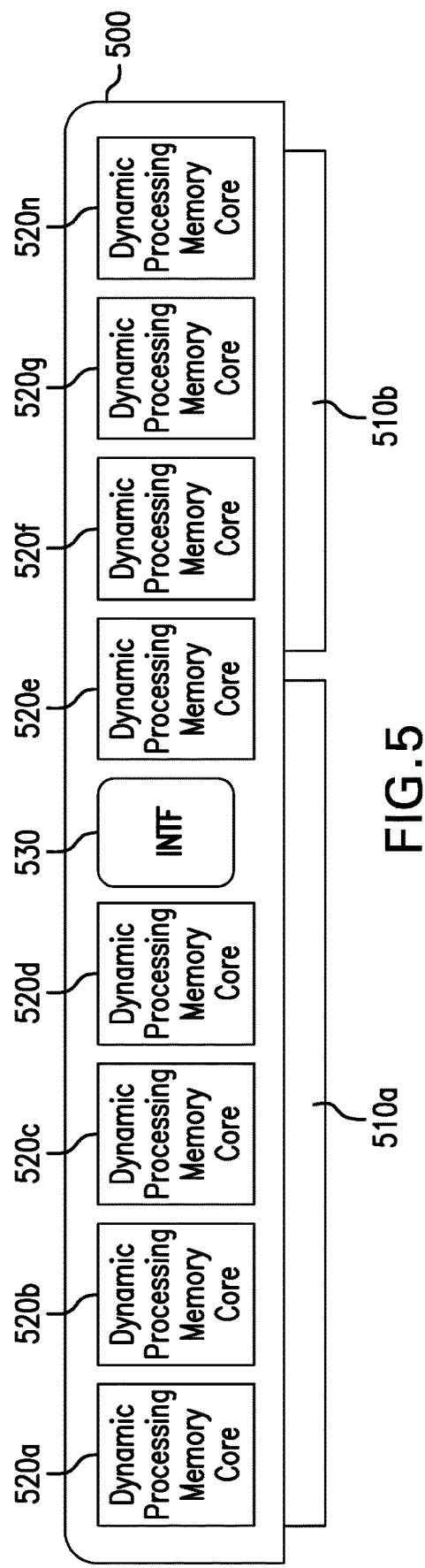

FIG. 4 depicts a block diagram of an exemplary dynamic processing memory core configuration such that numerous dynamic processing memory cores may be positioned on a single memory chip and engage in a configuration thereby generating dynamic processing memory core; and FIG. 5 is a block diagram of a dynamic DIMM such that a plurality of dynamic processing memory cores may be positioned on dynamic DIMM where dynamic DIMM may be positioned in a standard DIMM slot for a standard personal computer (PC).

DETAILED DESCRIPTION

The term "embodiment of the present invention" does not require that all embodiments of the present invention included the discussed feature, advantage or mode of operation. Alternate embodiments may be devised without departing from the scope of the present invention, and well-known elements of the present invention may not be described in detail or may be omitted so as not to obscure the relevant details of the present invention. In addition, the terminology used herein is for the purpose of describing particular embodiments only and is not intended to be limiting of the present invention. For example, as used herein, the singular forms "a", "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

System Overview

Figure 1:
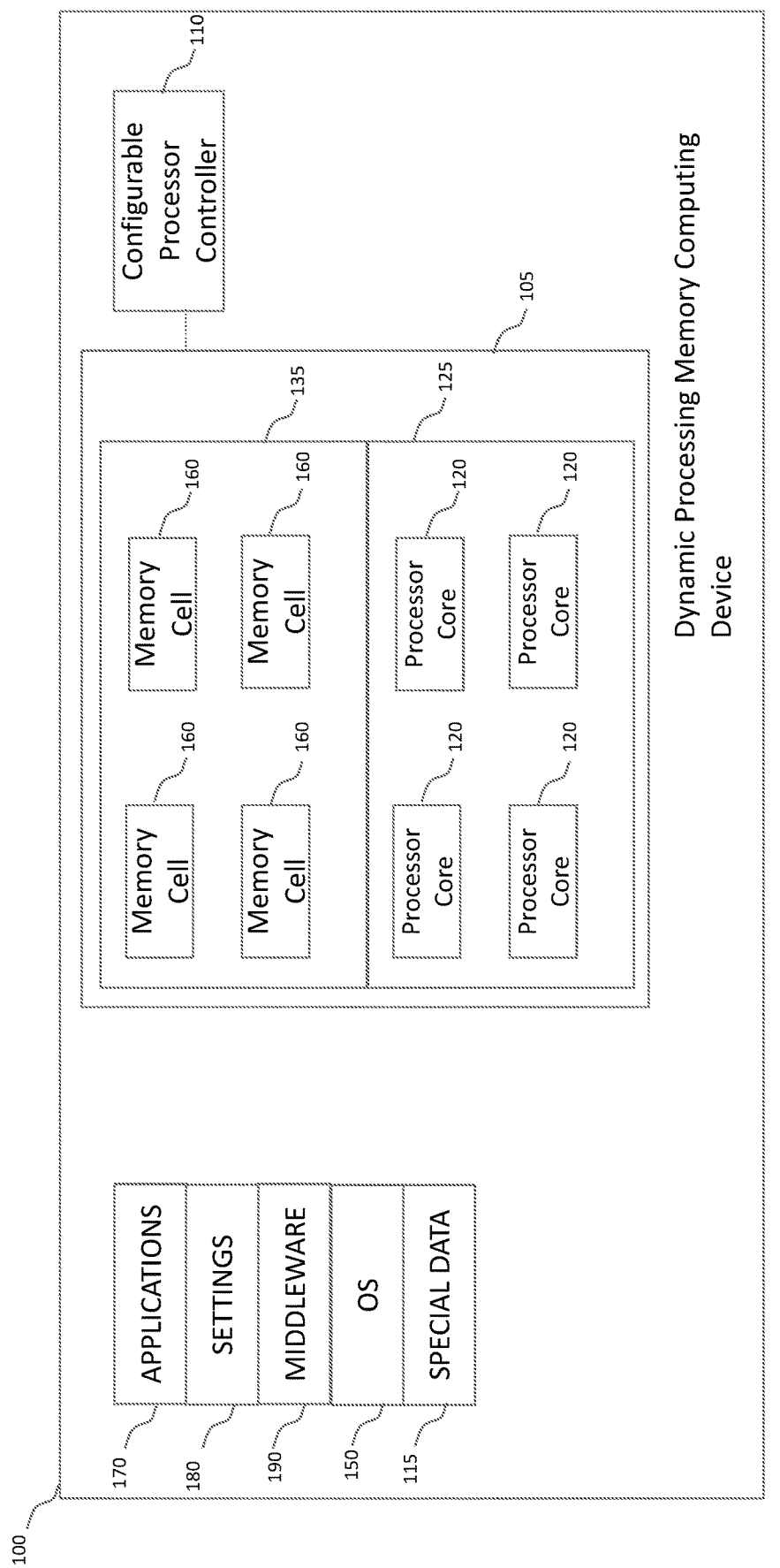
FIG. 1 shows a block diagram of an exemplary dynamic processing memory computing device.

FIG. 1 is a block diagram of an exemplary dynamic processing memory computing device 100 that includes a configurable processor controller 110, a dynamic processing memory core 105, applications 170, settings 180, a middleware layer 190, an operating system 150, and data 115 not associated with applications 170. Dynamic processing memory core 105 includes a dynamic processor 125 and a dynamic memory block 135. Dynamic processor 125 includes one or more processor cores 120. Dynamic memory block 135 includes one or more memory cells 160.

Dynamic processing memory computing device 100 may be a device that is capable of electronically communicating with other devices. Examples of dynamic processing memory computing device 100 may include a mobile telephone, a smartphone, a workstation, a portable computing device, other computing devices such as a laptop, or a desktop computer, cluster of computers, set-top box, a video player, an audio player, a product inventory checking system, and/or any other suitable electronic device that will be apparent to those skilled in the relevant art(s) without departing from the spirit and scope of the disclosure.

In an embodiment, multiple modules may be implemented on the same computing device. Such a computing device may include software, firmware, hardware, or a combination thereof. Software may include one or more applications or an operating system. Hardware can include, but is not limited to, a processor, a memory, and/or graphical user interface display.

Dynamic processing memory computing device 100 can include (not shown) one or more control processors, field programmable gate arrays (FPGA), application specific integrated circuits (ASIC), and/or digital signal processors (DSP). Dynamic processing memory computing device 100, for example, executes the control logic including operating system 150, applications 170, configurable processor controller 110, dynamic processor 125 that control operation of dynamic processing memory computing device 100. Dynamic processing memory computing device 100 may include one or more single or multi-core computing units.

Dynamic memory block 135 may include non-volatile memory as well as volatile memory. Volatile memory may include random access memory (RAM), dynamic random access memory (DRAM), static random access memory (SRAM), or other such memories positioned on the same chip that is separate from non-volatile memory also positioned on the same chip.

Volatile memory may store processing logic instructions, constant values, and variable values during execution of portions of applications and/or other processing logic. For example, in one embodiment, parts of control logic to perform one or more operations on dynamic processing memory computing device 100 may reside within volatile memory during execution of the respective portions of the operation by dynamic processing memory computing device 100. The term "processing logic" or "logic," as used herein, refer to control flow instructions, instructions for performing computations, and instructions for associated access to resources. During execution, respective applications 170, operation system functions 150, processing logic instructions and system software may reside in volatile memory. Control logic instructions fundamental to operating system 150 may generally reside in volatile memory during execution.

Operating system 150 includes components and software/firmware providing functionality to manage the hardware components of dynamic processing memory computing device 100 and to provide common services. In various embodiments, processes defined by operating system 150 may execute on dynamic processing memory computing device 100 and provide common services. These common services include, for example, scheduling applications for execution within dynamic processing memory computing device 100, fault, management, interrupt service, as well as processing the input and output of other applications. Operating system 150 and middleware 190 may run in either non-volatile memory 140, volatile memory 130, or some combination of both.

Processing logic for applications 170, operating system 150, and system software can include instructions specified in a programming language such as C and/or in a hardware description language such as Veriolog, RTL, or netlists, to enable configuring a manufacturing process through the generation of maskworks/photomasks to generate a hardware device embodying aspects of the present invention described herein.

A person skilled in the relevant art will understand, upon reading this description that dynamic processing memory computing device 100 can include one or more input interfaces, non-volatile storage, one or more output interfaces, network interfaces, and one or more displays or display interfaces.

Settings 180 may include but is not limited to dynamic processing memory computing device 100's network configuration, energy-saving preferences, X.509 security certificates, and/or data specific to applications 170 that exist outside a mode, such as the book marks associated with the web browser of dynamic processing memory computing device 100. Settings 180 may also describe access to settings rather than settings themselves.

Dynamic processing memory computing device 100 incorporates dynamic processing memory core 105 onto a single memory chip to enable computational processing and memory storage from the single memory chip. Dynamic processing memory core 105 may incorporate both dynamic memory block 135 and dynamic processor 125 onto the same single memory chip such that dynamic processor 125 may access memory such that dynamic processor 125 may access and/or transfer data to and from dynamic memory block 135 without having to transfer data off the single memory chip to access memory. The single memory chip is an integrated circuit that is positioned on a single piece of semiconductor material such that dynamic memory block 135 and dynamic processor 125 are positioned on the single piece of semiconductor material as the integrated circuit. Memory that is positioned off-chip from dynamic processor 125 is positioned on a different piece of semiconductor material and incorporated into a different integrated circuit than dynamic processor 125. Thus, dynamic processor 125 and dynamic memory block 135 may be positioned on the single memory chip as opposed to dynamic processor 125 accessing and/or transferring data to memory positioned off the single memory chip.

Dynamic processing memory core 105 may include dynamic memory block 135 and dynamic memory block 135 may include at least one memory storage device, such as one or more memory cells 160, and included in dynamic processing memory core 105 and positioned on the single memory chip. Dynamic memory block 135 may store a plurality of data elements with each data element stored at a memory location associated with memory cells 160. Dynamic memory block 135 may be dynamic in that any memory location associated with any memory cell 160 may be accessed by dynamic processor 125 and may transfer any data element stored in the corresponding memory location to dynamic processor 125 and/or store any data element provided by dynamic processor 125 as instructed by configurable processor controller 110. The data elements may include any type of data, settings, applications, instructions, rules, and/or any other type of computer based aspect that may be accessed by the operating system of a computing device that will be apparent from those skilled in the relevant art(s) without departing from the spirit and scope of the present disclosure.

Dynamic processing memory core 105 may also include dynamic processor 125 and dynamic processor 125 may include at least one processing device, such as one or more processor cores 120, and included in dynamic processing memory core 105 and positioned on the single memory chip. Dynamic processor 125 may execute a plurality of memory instructions with each memory instruction associated with corresponding data elements that are stored in corresponding memory locations associated with memory cells 160. Dynamic processor 125 may be dynamic in that any processor 120 may execute any memory instruction and in doing so access any memory location of any memory cell 160 and may transfer any data element stored in the corresponding memory location of the corresponding memory cell 160 to execute any memory instruction and/or transfer any data element in the corresponding memory location of the corresponding memory cell 160 in executing any memory instruction as instructed by configurable processor controller 110. The memory instruction is the instruction that each processor core 120 is to execute that requires each processor core 120 to access and/or transfer data to the corresponding memory location of the corresponding memory cell 160 as instructed by configurable processor controller 110.

Configurable processor controller 110 may transition dynamic processing memory core 105 from a memory storage device to a processing device by instructing at least one processing device, such as one or more processing cores 120, to execute at least one memory instruction that one or more processing cores 120 is to execute based on the memory location of the data elements that are associated with the at least one memory storage device, such as one or more memory cells 160. As noted above, dynamic processor 125 that includes one or more processor cores 120 that is positioned on a single chip as dynamic memory block 135 that includes one or more memory cells 160 to formulate dynamic processing memory core 105. In doing so, configurable processor controller 110 may transition dynamic processing memory core 105 into a processing device by instructing dynamic processor 125 to execute memory instructions thereby initializing the processing capabilities of dynamic processing memory core 105.

Configurable processor controller 110 may transition dynamic processing memory core 105 from the processing device to the memory storage device by instructing the at least one processing device, such as one or more processor cores 120, to not execute the memory instructions thereby terminating the computational processing of dynamic processing memory core 105 and maintaining the memory storage provided by the at least one memory storage device, such as one or more memory cells 160. As noted above, dynamic processor 125 and dynamic memory block 135 are positioned on a single chip to formulate dynamic processing memory core 105. In doing so, configurable processor controller 110 may transition dynamic processing memory core 105 into a memory storage device by instructing dynamic processor 125 to terminate the execution of memory instructions thereby transitioning dynamic processing memory core 105 from having processing capabilities to simply acting as a memory storage device with the memory cells 160 storing data elements.

Dynamic processing memory core 105 may serve dual roles in that dynamic processing memory core 105 may operate as a processing device in that dynamic processing memory core 105 executes memory instructions and/or a memory storage device in that dynamic processing memory core 105 stores memory instructions. Dynamic processing memory core 105 may operate as a processing device in executing memory instructions simultaneously as dynamic memory core 105 operates as a memory storage device in storing data elements in response to the execution of those memory instructions. Dynamic processing memory core 105 may also operate as simply a memory storage device in that dynamic processing memory core 105 may terminate the execution of memory instructions thereby no longer operating as a processing device and simply operating as a memory storage device.

Configurable processor controller 110 may instruct dynamic processing memory core 105 as to when to operate as a processing device as well as the memory instructions that are to be executed by each respective processor core 120 as well as the memory cells 160 that are to be accessed by each respective processor core 120 when executing the memory instructions. Configurable processor controller 110 may also instruct dynamic processing memory core 105 as to when to operate as a memory storage device as well as the memory cells 160 that are to store data elements.

The positioning of dynamic processor 125 and dynamic memory block 135 on a single chip may enable each of the processor cores 120 to access each of the memory cells 160 as instructed by configurable processor controller 110 when executing memory instructions without having to transfer data elements off the single chip when executing the memory instructions. Rather than each of the processor cores 120 having to transfer data elements to and/or access data elements from conventional memory positioned off-chip, each of the processor cores 120 may transfer data elements and/or access data elements from each of the memory cells 160 simply positioned on the same chip as included in dynamic processing core 105. In doing so, dynamic processing memory core 105 may have significant processing capabilities in that each of the processor cores 120 may transfer data elements to each of the memory cells 160 positioned on the same chip as included in dynamic processing memory core 105. In doing so, the delay in executing memory instructions when having to transfer data elements to conventional memory positioned off-chip is eliminated thereby enabling to execute a significant increase in memory instructions as well as an increase in complexity of memory instructions.

For example, the positioning of dynamic processor 125 and dynamic memory block 135 on a single chip as included in dynamic processing memory core 105 may enable dynamic processing memory computing device 100 to off-load computations from the central processing unit (CPU) and the GPU to dynamic processing memory core 105. The processing capabilities of dynamic processor 125 and the memory storage capabilities of dynamic memory block 135 positioned on a single chip as included in dynamic processing memory core 105 may enable dynamic processing memory core 105 to have the computation bandwidth and speed to execute such an increase of memory instructions as well as complex memory instructions to handle the computations of the CPU and GPU. In such an example, dynamic processing memory core 105 may execute memory instructions that are typically executed by the CPU as well as execute memory instructions typically executed by the GPU as instructed by configurable processor controller 110 thereby enabling dynamic processing memory core 105 to serve as an extension of the CPU and/or GPU due to the positioning of dynamic processor 125 and dynamic memory block 135 on a single memory chip included in dynamic processing memory core 105.

In doing so, dynamic processing memory core 105 may significantly increase the overall computation capabilities of dynamic processing memory computing device 100. For example, dynamic processing memory core 105 may provide a significant increase in computation power to dynamic processing memory computing device 100 such that dynamic processing memory computing device 100 may execute applications 170 associated with graphics, deep learning via a neural network, machine learning via a neural network, artificial intelligence, data processing, IoT applications, sensor fusion, self-driving cars, and/or any other type of application that requires significant computation capabilities that dynamic processing memory core 105 may be able to execute due to dynamic processor 125 and dynamic memory block 135 positioned on a single memory chip included as dynamic processing memory core 105 that will be apparent to those skilled in the relevant art(s) without departing from the spirit and scope of the disclosure.

Dynamic Processing Memory Core

Figure 2:
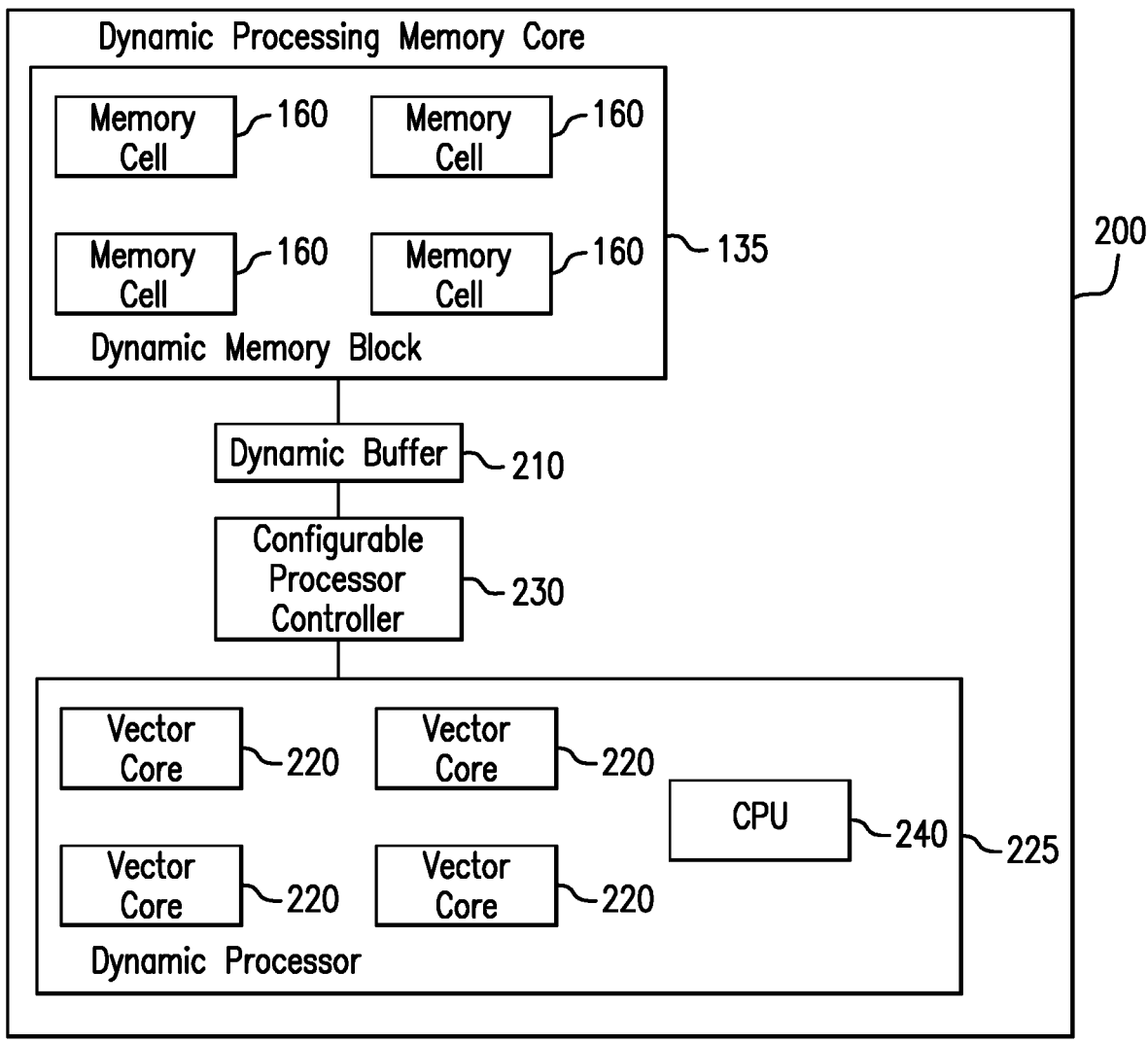
FIG. 2 is a block diagram of an exemplary dynamic processing memory core that provides further detail with regard to how dynamic processing memory core operates as both a processing device and a memory storage device.

As noted above, dynamic processing memory computing device 100 may operate as both a processing device and a memory storage device. FIG. 2 is a block diagram of an exemplary dynamic processing memory core 200 that provides further detail with regard to how dynamic processing memory core 200 operates as both a processing device and a memory storage device. Dynamic processing memory core 200 includes dynamic memory block 135, a dynamic buffer 210, a configurable processor controller 230, and a dynamic processor 225. Dynamic memory block 135 includes one or more memory cells 160. Dynamic processor 225 includes one or more vector cores 220 and a CPU 240. Dynamic processing memory core 200 shares many similar features with dynamic processing memory core 105; therefore, only the differences between dynamic processing memory core 200 and dynamic processing memory core 105 are to be discussed in further detail.

As noted above, dynamic memory block 135 may include one or more memory cells 160 in that configurable processor controller 230 may instruct dynamic memory block 135 as to the corresponding memory location in each corresponding memory cell 160 that may store data elements as dynamic processor 225 executes memory instructions. Further, dynamic memory block 135 may simply operate as a memory storage device and store data elements when configurable processor controller 230 instructs dynamic processor to no longer execute memory instructions. As noted above, dynamic memory block 135 may include volatile memory such that each memory cell 160 may incorporate volatile memory such as DRAM and/or SRAM and/or any combination thereof. The quantity of memory cells 160 included in dynamic memory block 135 may be any quantity and/or combination of volatile memory, such as DRAM and/or SRAM, that may be incorporated onto the single memory chip that dynamic memory processing core 200 is positioned on will be apparent to those skilled in the relevant art(s) without departing from the spirit and scope of the disclosure.

Configurable processor controller 230 may determine the memory location in each corresponding memory cell 160 that each data element is to be stored as dynamic processor 225 executes memory instructions. For example, a first data element associated with generating a graphic of a sphere may be stored in a first memory location of a first memory cell 160 as instructed by configurable processor controller 230. As dynamic processor 225 executes memory instructions to generate a graphic of the sphere, configurable processor controller 230 may allow dynamic processor 225 to access the first memory location of the first memory cell 160 to access the first data element stored there in generating the graphic of the sphere. Configurable processor controller 230 may then instruct a second memory location of a second memory cell 160 to store the first data element following the generation of the graphic of the sphere. In doing so, dynamic memory block 135 may be enabled to act as dynamic memory where the memory location of data elements that are stored and/or accessed may be adjusted in a dynamic manner as instructed by configurable processor controller 230.

Dynamic buffer 210 may assist in the dynamic access and/or storage of data elements in memory cells 160 of dynamic memory block 135 in that dynamic buffer 210 may be a region of physical memory storage that may temporality store data elements that are being transitioned between different memory locations of different memory cells 160 and dynamic processor 225 as dynamic processor 225 executes memory instructions. The dynamic transitioning of data elements between different memory locations of different memory cells 160 and dynamic processor 225 as instructed by configurable processor controller 230 requires dynamic buffer 210 to temporarily store data elements that have been requested by configurable processor controller 230 to be transitioned to and/or from dynamic processor 225 as dynamic processor 225 executes memory instructions.

Rather than simply operating as a conventional First In First Out (FIFO) buffer, dynamic buffer 210 may operate dynamically in that the data elements that are temporarily stored by dynamic buffer 210 are selected based on dynamic buffer 210 executing operations rather than simply releasing each data element to dynamic processor 225 on a FIFO basis. In doing so, memory cells 160 may be associated with dynamic buffer 210 and dynamic buffer 210 may select the respective data elements that are to be temporarily stored in dynamic buffer 210 and transitioned from each respective memory cell 160 to dynamic buffer 210 by executing operations. Vector cores 220 may also be associated with dynamic buffer 210 and dynamic buffer 210 may select the respective elements that are to be transitioned from dynamic buffer 210 to each respective vector core 220 for execution of memory instructions by executing operations.

For example, dynamic buffer 210 may execute arithmetic operations and/or logic operations to determine the data elements that are to be released to the dynamic processor 225 as well as the data elements that are to be temporarily stored in dynamic buffer 210 from dynamic memory block 135 before transitioning to dynamic processor 225. In such an example, dynamic buffer 210 may operate as an arithmetic logic unit (ALU) to select the data elements that are to be temporarily stored in dynamic buffer 210 from respective memory cells 160 as well as select the data elements that are to be transitioned to respective vector cores 220 in executing memory instructions based on the ALU operations executed by dynamic buffer 210. In such an example, dynamic buffer 210 in operation as an ALU may execute AND operations, OR operations, XOR operations, ADD operations, SUBTRACT operations, COMPARE operations, and/or any other operation that enables dynamic buffer 210 to adequately select the data operations to temporarily store from dynamic memory block 135 and/or transition to dynamic processor 225 that will be apparent to those skilled in the relevant art(s) without departing from the spirit and scope of the disclosure.

Configurable processor controller 230 may be positioned in between dynamic memory block 135 and dynamic processor 225 such that the data elements that are transitioned between dynamic memory block 135 and dynamic processor 225 flow through configurable processor controller 230. As noted above, configurable processor controller 230 may transition dynamic processing memory core 200 between operating as a processing device and/or operating as a memory storage device and/or operating as a processing device and memory storage device simultaneously. In doing so, configurable processor controller 230 may instruct each memory cell 160 as to the data elements that are to be stored in each respective memory cell 160 and/or transitioned from each respective memory cell 160 to a corresponding vector core 220 for execution of memory instructions. Configurable processor controller 230 may also instruct each vector core 220 as to the data elements that each vector core 220 is to access from each respective memory cell 160 as well as the memory location in each respective memory cell 160 as to each data element that is to be stored when executing the memory instructions. In doing so, configurable processor controller 230 may determine how dynamic processing memory core 200 is to execute memory instructions with regard to the execution of memory instructions via vector cores 220 and the storage and/or access of data elements via memory cells 160.

Configurable processor controller 230 may be a reconfigurable element that is positioned such that data elements flow through configurable processor controller 230 as data elements are transitioned between dynamic memory block 135 and dynamic processor 225. In doing so, configurable processor controller 230 may be dynamic in that configurable processor controller 230 may be reconfigured as to how to instruct and determine the transfer of data elements between dynamic memory module 160 and dynamic processor 225 in the execution of memory instructions. Configurable processor controller 230 may include FPGAs, ASICs, DSPs, and/or any other reconfigurable device that may enable configurable processor controller 230 to impact the transition of data elements between dynamic memory module 160 and dynamic processor 225 that will be apparent to those skilled in the relevant art(s) without departing from the spirit and scope of the disclosure.

Configurable processor controller 230 may determine whether each data element is to be compressed when stored in each corresponding memory location associated with each memory cell 160 and whether each data element is to be decompressed when executed by dynamic processor 225. With dynamic memory block 135 and dynamic processor 225 positioned on a single memory chip and included in dynamic processing memory core 200 such that data elements do not have to be transitioned off-chip, configurable processor controller 230 is also included in dynamic processing memory core 200 such that the compression and/or decompression of the data elements is also done on the single memory chip. As data elements are transitioned between dynamic memory core 135 and dynamic processor 225, configurable processor controller 230 may compress and/or decompress the data elements such that the amount of memory space occupied in dynamic memory core 135 is reduced while still maintaining sufficient data elements in a compressed state for dynamic processor 225 to adequately execute the memory instructions. An increased amount of data elements may be stored in dynamic memory core 135 when configurable processor controller 230 compresses the data elements to be stored in dynamic memory block 135. The data elements may then be decompressed such that dynamic processor 225 may sufficiently incorporate the data elements to execute the memory instructions.

Configurable processor controller 230 may dynamically determine the data elements to compress and/or decompress as configured. For example, configurable processor controller 230 may determine the data elements to compress and/or decompress based on applications 170 executed by dynamic processing memory core 200. In such an example, configurable processor controller 230 may dynamically compress all data elements that are stored in dynamic memory module 135 and then decompress all data elements that are to be transitioned to dynamic processor 225 when dynamic processing memory core 200 is executing a first application 170. Configurable processor controller 230 may selectively compress a first portion of data elements while refraining from compressing a second portion of data elements that are stored in dynamic memory module 135 and then decompressing the first portion of data elements that are to be transitioned to dynamic processor 225 when dynamic processing memory core 200 is executing a second application 170. Configurable processor controller 230 may then dynamically refrain from compressing any data elements that are stored in dynamic memory module 135 when dynamic processing memory core 200 is executing a third application 170.

Configurable processor controller 230 in being positioned such that data elements flow through configurable processor 230 controller when transitioning between dynamic memory block 135 and dynamic processor 225 enables configurable processor controller 230 to reduce the memory space of dynamic memory module 135 that is occupied by the data elements before and/or after the data elements are incorporated into vector cores 220. For example, dynamic processing memory core 200 is to execute memory instructions regarding a 32-bit pixel. Rather than storing a 32-bit pixel in dynamic memory block 135 after the 32-bit pixel is generated by dynamic processor 225, configurable processor controller 230 may decompress the 32-bit pixel down to an 8-bit pixel and thereby the 8-bit pixel is stored in dynamic memory block 135 instead of the 32-bit pixel. Thus, significant memory space of dynamic memory block 135 is conserved in the compression of the 32-bit pixel to the 8-bit pixel. Configurable processor controller 230 may then decompress the 8-bit pixel to a 32-bit pixel when dynamic processor 225 requires the 32-bit pixel to execute memory instructions.

The compression and/or decompression of configurable processor controller 230 may also provide additional security features to dynamic processing memory core 135. In order for a hacker to fraudulently access the data elements stored in dynamic memory module 135, the hacker would have to determine the compression scheme in how configurable processor controller 230 compressed the data elements in order for the hacker to then adequately decompress the data elements to gain access to the data included in the data elements.

For example, dynamic processing memory core 200 may be incorporated into a database application 170 where dynamic processing memory core 200 is searching through hundreds of thousands of records. Configurable processor controller 230 may then compress the data elements associated with the hundreds of thousands of records and store in dynamic memory block 135. Configurable processor controller 230 may then decompress the data elements in real-time when dynamic processing memory core 200 is to execute applications 170 regarding searching through the hundreds of thousands of records. After the data elements are decompressed and analyzed and no longer needed by dynamic processor 225, configurable processor controller 230 may then compress the data elements again in real-time but incorporate a different compression scheme in the compressing. Configurable processor controller 230 may then adjust the compression scheme of the compressed data elements after a period of time expires over and over again. For example, configurable processor controller 230 may adjust the compression scheme every 5 seconds thereby requiring any hacker to somehow determine the compression scheme of the data elements that automatically changes every 5 seconds in order to access the data elements. In doing so, personal addresses, social security numbers, and so on may be stored securely in dynamic memory block 135 and safe from any potential hackers.

Configurable processor controller 230 may execute operations such as but not limited to COMPARE, Boolean Operations such as AND, OR, XOR, NOT and so on, 2's Complement, shifter/rotate (L/R), adder, subtractor, interpolator (linear/bilinear), counter, incrementer, decrementer, CODEC, compress, duplicate, Bitfield extension, SHA-256 and other cryptographic hardware and/or any other operation that will be apparent to those skilled in the relevant art(s) without departing from the spirit and scope of the disclosure.

As noted above, dynamic processor 225 includes one or more vector cores 220. Dynamic processor 225 may incorporate a CPU 240 and then each vector core 220 is an extension of CPU 240 thereby creating dynamic processor 225. For example, dynamic processor may incorporate CPU 240 such as Reduced Instruction Set Computer (RISC) processor, a Microprocessor without Interlocked Pipeline States (MIPS) processor, a RISC-V processor, and/or any other type of CPU that may be incorporated with vector cores to create dynamic processor 225 that will be apparent to those skilled in the relevant art(s) without departing from the spirit and scope of the disclosure.

In doing so, CPU 240 may operate as a CPU while vector cores 220 serve as an extension of CPU 240 significantly increasing the processing capabilities of dynamic processor 225 while maintaining dynamic memory block 135 on a single chip with dynamic processor 225 thereby significantly increasing the processing capabilities of dynamic processing memory core 200 further. CPU 240 may be incapable of executing parallel processing, such as parallel multiplies and/or adds. For example, the CPU 240 by itself without vector cores 220 may require sixteen cycles to execute a four by four matrix multiply as each matrix multiply is executed by CPU 240 on an individual basis such that the first matrix multiply is to occur before executing the second matrix multiply and so on until CPU 240 has executed each of the sixteen matrix multiplies.

However, incorporating vector cores 220 with CPU 240 such that vector cores 220 are an extension of CPU 240 to formulate dynamic processor 225, each vector core 220 provides additional processing capabilities in that each vector core 220 may execute operations simultaneously thereby providing parallel computing capabilities to dynamic processor 225. In doing so, each vector core 220 enables dynamic processor 225 to execute multiple add/multiply operations in parallel thereby significantly increasing the processing capabilities of dynamic processor 225. For example, rather than requiring sixteen cycles to complete the four by four matrix multiply, each vector core 240 may execute a matrix multiply in parallel with each other vector core 240 such that the matrix multiplies are completed simultaneously by each vector core 240 rather than requiring each matrix multiply be performed before performing the subsequent matrix multiply. In such an example where the quantity of vector cores 240 is four, each of the four vector cores 240 may execute four matrix multiplies simultaneously thereby simply requiring four cycles to complete the four by four matrix multiply rather than sixteen cycles.

Thus, applications 170 that dynamic processing memory core 200 may execute significantly increases with the extension of vector cores 220 to CPU 240. For example, the extension of vector cores 220 to CPU 240 may enable dynamic processing memory core 200 to execute applications 170 typically executed by a conventional GPU. Conventional GPUs execute triangle rendering in space to generate graphics and in doing so execute several matrix multiplies to generate the screen view of the graphics. The extension of vector cores 220 to CPU 240 enables dynamic processing memory core 200 to also execute a significant amount of matrix multiplies in parallel thereby enabling dynamic processing memory core 200 to execute applications 170 typically executed by conventional GPUs.

However, conventional GPUs require significant power consumption, such as 200 W or higher. Conventional GPUs have to interact with conventional CPUs and in doing so the conventional GPUs and the conventional CPUs are not positioned on a single memory chip but are rather positioned off-chip from each other. The interaction of conventional GPUs with significant power consumption with conventional CPUs off-chip from each other thus requiring additional power for not only the conventional GPU but also the conventional CPU as well as any conventional memory that is also positioned off-chip from the conventional GPU and the conventional CPU.

The extension of vector cores 220 with CPU 240 as positioned together to form dynamic processor 225 enables dynamic processing memory core to have the processing capabilities to execute applications 170 that are typically executed by conventional GPUs. Further, the positioning of dynamic memory block 135 on a single memory chip as vector cores 220 and CPU 240 further increases the processing capabilities of dynamic processing memory core 200 with significantly less power consumption than the conventional GPU and conventional CPU configurations. Rather than requiring more than 200 W of power, dynamic processing memory core 200 may execute similar graphic related applications 170 as the conventional GPU while requiring less than 10 W of power. In an embodiment, dynamic processing memory core 200 may require less than 1 W of power to execute graphic related applications 170.

In an embodiment, at least one vector processor, such as one or more vector cores 220, may interact with configurable processor controller 230 to determine the memory instructions the one or more vector cores 220 is to execute. The one or more vector cores 220 may then execute the memory instructions that configurable processor controller 230 requests the one or more vector cores 220 to execute. Configurable processor controller 230 may determine each memory instruction that each vector core 220 is to execute as well as each memory instruction that CPU 240 is to execute. In doing so, the appropriate memory instructions may be executed in parallel by incorporating each vector core 220 while still utilizing CPU 240 as required for each memory instruction. Configurable processor controller 230 may customize the execution of the memory instructions to best utilize the processing capabilities of each vector core 220 and CPU 240. For example, configurable processor controller 230 may instruct each vector core 220 to execute different memory instructions associated with generating a graphic in order to utilize the parallel computation capabilities of each vector core 220. In another example, configurable processor controller 230 may not require vector core 220 to execute memory instructions that are simpler and do not require parallel computation capabilities and that CPU 240 may be better suited to handle.

In an embodiment, CPU 240 may determine the memory instructions that one or more vectors 220 is to execute as well as the memory instructions CPU 240 is to execute based on application 170. CPU 240 may determine from application 170 whether vectors 220 are to be incorporated to execute memory instructions associated with application 170 and/or CPU 240 such that the execution of memory instructions may be customized to application 170. In doing so, the appropriate memory instructions may be executed in parallel by incorporating each vector core 220 while still utilizing CPU 240 as required based on application 170. CPU 240 may customize the execution of the memory instructions to best utilize the processing capabilities required for application 170. For example, CPU 240 may determine that application 170 requires the generation of a graphic and that the parallel computation capabilities of each vector core 220 are required. In another example, CPU 240 may determine that application 170 does not require parallel computation capabilities and that CPU 240 may be better suited to handle.

In an embodiment, dynamic processor 225 may include vector cores 220 such that vector cores 220 execute vector processing such as matrix multiplies, vector/matrix multiplies, and so on. In doing so, vector cores 220 may execute such vector processing, such as multiplier operations, in parallel with each other vector core 220 in executing the memory instructions required by application 170. In an embodiment, vector cores 220 may include four different vector cores 220 such that each of the four vector cores 220 may execute a component of the four-dimensional vector space. In doing so, dynamic processor 225 may execute many different applications 170 that require the execution of components of the four-dimensional vector space by executing vector processing of each of the four components in parallel by each of the four vector cores 220.

For example, colors in digital signal processing (DSP) have four components in RGB values as well as an A value. Each of the four vector cores 220 may execute vector processing for each of the components of the colors in parallel. In such an example, a first vector core 220 may execute multiply operations associated with R, a second vector core 220 may execute multiply operations associated with G, a third vector core 220 may execute multiply operations associated with B, and a fourth vector core 220 may execute multiply operations associated with A. In doing so, each of the four vector cores 220 may execute the multiply operations with RGB and A in parallel.

In another example, points in space have four components in x, y, z, and a homogenous coordinate of w. Each of the four vector cores 220 may execute vector processing for each of the components of the points in space in parallel. In such an example, a first vector core 220 may execute multiply operations associated with x, a second vector core 220 may execute multiply operations associated with y, a third vector core 220 may execute multiply operations associated with z, and a fourth vector core 220 may execute multiply operations associated with w. In doing so, each of the four vector cores 220 may execute the operations with x, y, z, and the homogeneous coordinate of w in parallel. However, dynamic processor 225 may include any quantity of vector cores 220 in order to execute multiply operations in parallel will be apparent to those skilled in the relevant art(s) without departing from the spirit and scope of the disclosure.

At least one vector core 220, such as one or more vector cores 220 may interpolate between a first data element and a second data element to determine a plurality of interpolated data elements that are between the first data element and the second data element thereby enabling the one or more vector cores 220 to function as an interpolator. Dynamic processor 225 may operate as an interpolator in that each vector core may determine data elements that are between a first data element and a second data element by executing multiplier operations in parallel. A first data element is an actual data element that exists in an application 170, such as a color of a first pixel included in a graphic that that is to be generated. A second data element is an actual data element that exists in application 170, such as a color of a second pixel included in a graphic that is to be generated. Rather than obtain each actual data element associated with the color of each pixel of a graphic that is to be generated, each vector core 220 may determine interpolated data elements that are positioned between the first data element and the second data element based on interpolation. In such an example, each vector core 220 may interpolate the color of the first pixel and the color of the second pixel to generate the interpolated colors of the pixels in between the first pixel and the second pixel. Further, each of the vector cores 220 may determine such interpolated colors in parallel.

Each vector core 220 may receive a first data element with a first value and a second data element with a second value from corresponding memory locations that the first data element and the second data element are stored in memory cells 160 per the corresponding memory instruction that configurable processor controller 230 requests each vector core 220 to execute. Each vector core 220 may then generate a linear line and a gradient between the first data element and the second data element to interpolate between the first data element and the second data elements. Each vector core 220 may then determine a plurality of interpolated data elements that are data elements with corresponding values that are between the first value of the first data element and the second value of the second data element as generated from the interpolation between the first data element and the second data element.

For example, as dynamic processing memory core 200 colors a screen in generating a graphic for a graphic application 170, each vector core 220 generates interpolated data elements based on generating a linear line and a gradient between the color values of two different pixels. Each of the two pixels includes four components in RGB and A such that each pixel includes four values associated with RGB and A. Each of the four vector cores 220 then execute a 4×1 multiply for each pixel in that a linear line and gradient is generated between the two pixels for RGB and A and is done so in parallel by each of the four vector cores 220 thereby generating interpolated pixels in between the first pixel and the second pixel with each of the interpolated pixels including interpolated values for RGB and A.

In an embodiment, dynamic processor 225 may operate with single precision with a 32-bit floating point rather than a 64-bit floating point. In doing so, the amount of die area required for dynamic processing memory core in being incorporated onto a single memory chip may be reduced significantly than if a 64-bit floating point is incorporated. However, dynamic processing memory core 200 may still maintain the performance of a 64-bit floating point despite incorporating a 32-bit floating point due to vector cores 220 being able to execute vector processing in parallel. With each vector core 220 including a multiplier operator, each vector core 220 is able to execute vector processing in parallel and thereby obtain the performance of a 64-bit floating point despite incorporating a 32-bit floating point and is able to do so with less die space than when incorporating 64-bit floating point. However, dynamic processing memory core may incorporate any type of bit precision that will be apparent to those skilled in the relevant art(s) without departing from the spirit and scope of the disclosure.

In an embodiment, one-bit ALUs may be incorporated with each of the 32 bits such that each of the one-bit ALUs may be individually addressed. In doing so, dynamic processing memory core 200 may be able to execute pixel level processing by incorporating z-buffers, Alpha components, tensile components and so on which each are single bit operations. In doing so, each one-bit ALU may incorporate the one-bit elements and execute one-bit COMPAREs, one-bit ANDs, one-bit OR, one-bit XOR, and so on.

Dynamic processing memory core 200 may have capabilities that include but are not limited to floating point extensions, special function units (RAM based and/or logic), graphic extensions (programmable and/or atomic), vector/matrix operations, lighting, clipping, per-pixel divide, rasterizer operations and/or any other capability that will be apparent to those skilled in the relevant art(s) without departing from the spirit and scope of the disclosure.

Graphic Rendering of Dynamic Processing Memory Core

As noted above, the conventional GPU generates graphics by rendering the object that is to be generated into a graphic into triangles when generating the graphic. The conventional GPU includes hardware such that registers are components of the conventional GPU and hardwired together such that the conventional GPU renders the object into triangles to generate the graphic of the object. In rendering the object into triangles to generate the graphic of the object, the conventional GPU executes a significant amount of matrix multiplies to convert the object into the screen view depicting the object as a graphic. The conventional GPU then colors each of the points on the triangle rendered by the conventional GPU and textures the points on the rendered triangle such that the points depict a triangle with a graphic of the object positioned on the rendered triangle.

However, the rendering of the object into triangles in generating the graphic of the object by the conventional GPU via the hardware configuration that mandates the rendering of triangles consumes significant power in generating the graphic such that the conventional GPU consumes a significant amount of power. As noted above, the conventional GPU consumes 200 W or more when generating the graphic of the object via the hardware configuration that renders the object into triangles. Further, the conventional GPU is limited to rendering the object into triangles to generate the graphic of the object due to the hardware configuration. The hardware configuration designed to render the object into triangles to generate the graphic limits the conventional GPU from any flexibility in generating the graphic of the object in any different manner. For example, in rendering an object that is a sphere into a graphic of the sphere, the conventional GPU is limited to converting the sphere into triangles to generate the graphic of the sphere. The sphere is not a triangle and more efficient approaches to convert the sphere into a graphic without rendering the sphere into triangles exist. However, the conventional GPU is unable to incorporate those more efficient approaches due to the limitation of the triangle rendering of the hardware configuration of the conventional GPU.

Rather than being limited to rendering the object into triangles in generating the graphic of the conventional GPU as in the hardware configuration of the conventional GPU, dynamic processing memory core 200 may have significantly more flexibility in incorporating more efficient approaches to generating the graphic of the object. As noted above, dynamic processor 225 may incorporate CPU 240 and vector cores 220 such that vector cores 220 are an extension of CPU 240 and provide parallel processing capabilities such that dynamic processor 225 may generate graphics of objects without requiring the conventional GPU. Dynamic processor 225 does not include the hardware configuration that renders the object into triangles in generating the graphic of the object. Rather dynamic processor 225 may have the flexibility via software to select different types of approaches in generating the graphic of the image such that the approach in generating the graphic of the image may be customized to the object.

Based on application 170 that dynamic processor 225 is to execute in generating a graphic of an object as required by application 170, dynamic processor 225 may select the appropriate approach to generate the graphic of the object based on application 170. For example, application 170 may require that dynamic processor 225 render a graphic of an object that is a sphere. Rather than being limited to rendering the sphere into triangles to generate the graphic of the sphere as the conventional GPU is required to do, dynamic processor 225 may select spherical linear interpolation which may be a more efficient approach to rendering the object of the sphere into the graphic as opposed to rendering the sphere into triangles to generate the graphic of the sphere. Thus, dynamic processor 225 may include the flexibility to apply a customized approach to generating a graphic of an object based on application 170 as opposed to being limited to a specific approach such as rendering into triangles due to a hardware configuration that requires such a specific approach. In an embodiment, CPU 240 may determine the approach to apply to generating the graphic of the object based on application 170. In another embodiment, configurable processor controller 230 may determine the approach to apply to generating the graphic of the object based on application 170.

Figure 3A:
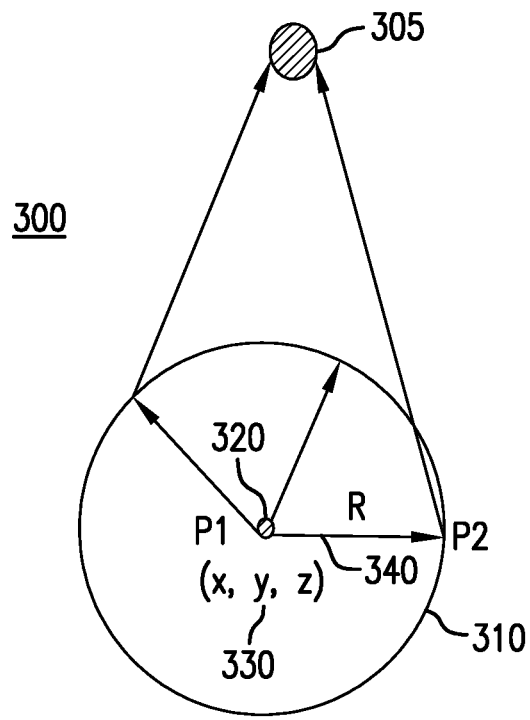
FIG. 3A depicts a block diagram of an example object rendering configuration such that an example object is to be rendered into a graphic by dynamic processing memory core as requested by application.

FIG. 3A depicts a block diagram of an example object rendering configuration 300 such that an example object is to be rendered into a graphic by dynamic processing memory core 200 as requested by application 170. In such an example, application 170 requests that dynamic processing memory core 200 render an object that includes a sphere 310 into a graphic as required in executing a video game, for example. Dynamic processing memory core 200 may define sphere 310 via a center point 320 of sphere 310 in P1 that has coordinates 330 of (x, y, z). Dynamic processing memory core 200 may also define sphere 310 via radius 340 in R thus each point positioned on sphere such as P2 may be equidistant from center point 320 of P1 in three-dimensional space such dynamic processing memory core 200 determines a quantity of points such as P2 to render in generating the graphic of sphere 310.

Figure 3B:
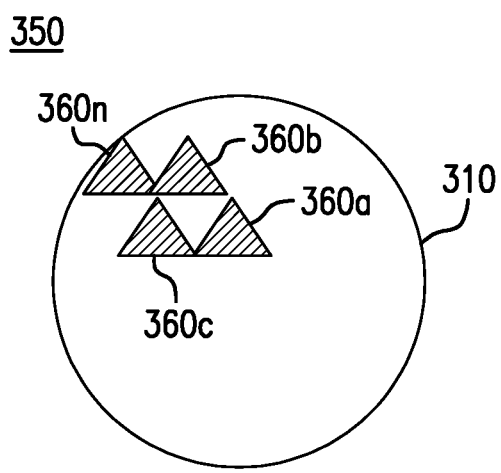
FIG. 3B depicts a block diagram of a conventional triangle rendering configuration.

FIG. 3B depicts a block diagram of a conventional triangle rendering configuration 350. In generating the graphic of sphere 310, the conventional GPU may render sphere 310 into a plurality of triangles 360(*a-n*) to generate the graphic of sphere 310. However as depicted in FIG. 3B, sphere 310 is not in a triangle format but is in a sphere format. Thus, rendering sphere 310 into triangles 360(*a-n*) to generate the graphic of sphere 310 by the conventional GPU is not an efficient approach to generate the graphic of sphere 310. However, the conventional GPU is limited to rendering sphere 310 into triangles 360(*a-n*) due to the hardware configuration of the conventional GPU that limits the conventional GPU to rendering objects into triangles to generate the graphics of the objects.

Rather, dynamic processing memory core 200 may incorporate dynamic processor 225 to generate the graphic of sphere 310 with a customized approach for sphere 310. Each distance from center point 320 of P1 to each other point that is equidistant from center point 320 of P1 and positioned in three-dimensional space on sphere 310 such as P2 may be determined from coordinates 330 of (x, y, z) of center point P1. As noted above, each point in space may have coordinates (x, y, z) and a homogeneous component of w, thus each point in space has four components. Each vector core 220 may then determine the distance of each point positioned in three-dimensional space from center point 320 of P1 on sphere 310 by executing matrix multiplies in parallel such that a first vector core 220 executes the matrix multiplies for x, a second vector core 220 executes the matrix multiplies for y, a third vector core 220 executes the matrix multiplies for z, and a fourth vector core 220 executes matrix multiplies for w in that each vector core 220 does so in parallel.

Each point that is equidistant from center point 320 of P1 and positioned in three-dimensional space on sphere 310 such as P2 may also have a color associated with the corresponding point in that the color has four components in RGB and A. Each core vector 220 may then determine the color of each point positioned in three-dimensional space from center point 320 of P1 of sphere 310 by executing matrix multiplies in parallel such that a first vector core 220 executes the matrix multiplies for R, a second vector core 220 executes the matrix multiplies for G, a third vector core 220 executes the matrix multiplies for B, and a fourth vector core 220 executes the matrix multiplies for A in that each vector core 220 does so in parallel.

Each point that is equidistant from center point 320 of P1 and positioned in three-dimensional space on sphere 310 such as P2 may also have normal coordinates of (u, v, w) and a coordinate in (s,t). Each core vector 220 may then determine the vector coordinates of each point positioned in three-dimensional space for center point 320 of P1 of sphere 310 by executing matrix multiplies in parallel such that a first vector core 220 executes the matrix multiplies for u, a second vector core executes the matrix multiplies for v, a third vector core executes the matrix multiplies for w, and a fourth vector core executes the matrix multiplies for s or t in that each vector core 220 does so in parallel.

Each point that is equidistant from center point 320 of P1 and positioned in three-dimensional space on sphere 310 such as P2 may also have light values that are generated from a light source 305 that is emanated onto sphere 310 such that each point may have different light values based on the light that each point absorbs from light source 305 as positioned on sphere 310. The light values may also include four components such that each core vector 220 may execute matrix multiplies on each corresponding light value for each point and do so in parallel.

In doing so, dynamic processor 225 may determine numerous characteristics associated with numerous points that are equidistant from center point 320 of P1 and positioned in three-dimensional space on sphere 310 such as P2 and may do so in an efficient manner due to the parallel processing capabilities of vector cores 220 and the four vector nature of the different characteristics. In the example above, characteristics the include (x, y, z) coordinates, RGB and A values, normal coordinates in (u, v, w), light source coordinates and so on are four vector in nature in that each include four components. The parallel processing capabilities of vector cores 220 enables values to be determined associated with the numerous characteristics for numerous points positioned on sphere 310 such that a graphic of increased quality may be generated of sphere 310. Rather than simply generating a graphic of sphere 310 based on a single characteristic such as (x, y, z), the graphic of sphere 310 may be generated based on numerous characteristics due to the parallel processing capabilities of vector cores 220 thereby resulting in a graphic of sphere 310 of increased quality that is similar to the quality that is generated by the conventional GPU. However, dynamic processor 225 may do so without relying on the capabilities of the conventional GPU thereby generating graphics of increased quality without having to consume the power that the conventional GPU consumes.

As dynamic processor 225 executes the parallel processing operations by vector cores 220 to generate the values for each of the different characteristics of sphere 310, dynamic processing memory core 200 may execute rasterization in that the three-dimensional points such as P2 is converted into a three-dimensional plane that is then displayed. Rather than doing a rasterization by converting sphere 310 into triangles as the conventional GPU, dynamic processing memory core 200 may select a customized approach to rasterize sphere 310 which in this example is spherical linear interpolation due to the object to be rasterized is sphere 310. The conventional GPU in executing the rasterization by rendering sphere 310 into triangles interpolates the values of each characteristic for each respective point for sphere 310 along conventional line 380. For example, the conventional GPU determines the (x, y, z) values by executing linear interpolation for the first conventional point 385a, then the second conventional point 385b, and the third conventional point 385n and so on with the linear interpolation occurring along the conventional line 380.

Figure 3C:
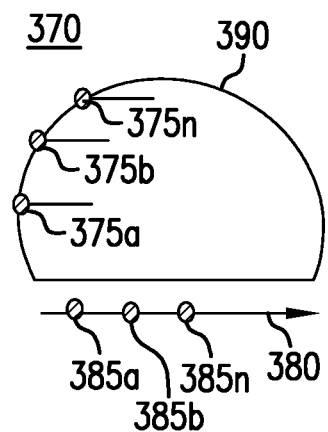
FIG. 3C depicts a block diagram of an exemplary spherical linear interpolation configuration that is executed by dynamic processing memory core.

However, sphere 310 is not generated via lines but rather arcs. Rather than executing the rasterization by rendering sphere 310 into triangles where the conventional GPU may interpolate the values of each characteristic for each respective point for sphere 310 along conventional line 380, dynamic processing memory core 200 may interpolate along arc 370. FIG. 3C depicts a block diagram of an exemplary spherical linear interpolation configuration 370 that is executed dynamic processing memory core 200. Rather than determining the values of each characteristic for the next point of sphere 310 by interpolating along conventional line 380 as the conventional GPU does, dynamic processing memory core 200 may determine the values of each characteristic for the next point 310 by determining sine and cosine values for the next point positioned on arc 370. For example, dynamic processing memory core 200 may determine the (x, y, z) values by determining the sine and/or cosine values of point 375a, and then by determining the sine and/or cosine values of point 375b, and then by determining the sine and/or cosine values of point 375n and so on with spherical linear interpolation occurring along arc 390. In doing so, the sine and/or cosine values of each point 375(a-n) dynamically change along arc 370 to determine the values of each characteristic for each subsequent point positioned along arc 370.

In doing so, spherical linear interpolation may be significantly more conducive to generate the graphic of sphere 310 rather than incorporating linear interpolation with the rendering of sphere 310 into triangles. As noted above, dynamic processing memory core 200 may have such flexibility due to not having to rely on a hardware configuration that mandates the triangle rendering of the conventional GPU. However, the positioning of dynamic memory block 135 and dynamic processor 225 on a single memory chip as well as the parallel processing capabilities of vector cores 220 as an extension of CPU 240 enables the dynamic processing memory core 200 to generate the graphics of objects with such customized rendering while still having an increased performance to generate graphics of similar quality as generated by the conventional GPU.

Dynamic Processing Memory Core Configuration

FIG. 4 depicts a block diagram of an exemplary dynamic processing memory core configuration 400 such that numerous dynamic processing memory cores 200 may be positioned on a single memory chip and engage in a configuration thereby generating dynamic processing memory core. Dynamic processing memory core configuration 400 includes a plurality of dynamic processing memory cores 420(*a-n*), where n is an integer equal to or greater than one, and a cross bar switch 410. Dynamic processing memory cores 420(*a-n*) share many similar features with dynamic processing memory core 105 and dynamic processing memory core 200; therefore, only the differences between dynamic processing memory cores 420(*a-n*) and dynamic processing memory core 105 and dynamic processing memory core 200 are to be discussed in further detail.

Numerous dynamic processing memory cores 420(*a-n*) may be positioned on a single memory chip in order to formulate dynamic processing memory core configuration 400. In doing so, the capabilities of each dynamic processing memory core 420(*a-n*) as discussed in detail above may be incorporated onto the single memory chip to formulate dynamic processing memory core configuration 400 such that dynamic processing memory core configuration 400 may incorporate the processing capabilities of each dynamic processing memory core 420(*a-n*) thereby significantly increasing the processing capabilities of dynamic processing memory core configuration 400. Each dynamic processing memory core 420(*a-n*) may be replicated and positioned on the single memory chip to formulate a multi-processor array that is encapsulated by dynamic processing memory core configuration 400.

Crossbar switch 410 may be coupled to each dynamic processing memory core 420(*a-n*) and enable each dynamic processing memory core to share data elements with each other dynamic processing memory core 420(*a-n*) and to access each memory storage device included in each dynamic processing memory core 420(*a-n*) as instructed by configurable processing controllers. In incorporating the processing capabilities of each individual dynamic processing memory core 420(*a-n*) into the overall processing capabilities of dynamic processing memory core configuration 400, each dynamic processing memory core 420(*a-n*) may be able share data elements with each other when executing memory instructions. For example, a first dynamic processing memory core 420*a* may be able to access the data elements stored in the dynamic memory block of dynamic processing memory core 420*b* when executing memory instructions. The sharing of data between each dynamic processing memory core 420(*a-n*) may occur due to cross bar switch 410. Cross bar switch 410 may enable each dynamic processing memory core 420(*a-n*) to share data elements amongst other dynamic processing memory cores 420(*a-n*) as well as access the dynamic memory blocks of each dynamic processing memory core 420(*a-n*).

In doing so, dynamic processing memory core configuration 400 may provide parallel processing capabilities in that each dynamic processing memory core 420(*a-n*) may execute different memory instructions in parallel. For example, dynamic processing memory core 420*a* may execute a first memory instruction. If dynamic processing memory core 420*a* is occupied and busy executing the first memory instruction, then second dynamic processing memory core 420*b* may execute a second memory instruction simultaneously as dynamic processing memory core 420*a* is executing the first memory instruction.

Each configurable processor controller for each dynamic processing memory core 420(*a-n*) may determine a plurality of memory instructions that each dynamic processing memory core is to execute. Each plurality of memory instructions includes a plurality of data elements to be incorporated into the execution of each plurality of memory instructions. Each configurable processor controller may instruct each dynamic processing memory core 420(*a-n*) as each plurality of data elements that is to be shared between each corresponding dynamic memory core in each dynamic processing memory core executing each corresponding plurality of memory instructions. Each plurality of data elements is shared between each corresponding dynamic processing memory core 420(*a-n*) via crossbar switch 410.

Crossbar switch 410 enables the sharing of data elements between dynamic processing memory cores 420(*a-n*). In doing so, each dynamic processing memory core 420(*a-n*) may be able to execute not only different memory instructions simultaneously but also different applications 170 simultaneously. For example, first dynamic processing memory core 420*a* may be allocated to executing a graphic application 170, second dynamic processing memory core 420*b* may be allocated to executing a physics calculation application 170, and third dynamic processing memory core 420*c* may be allocated to executing an artificial intelligence application 170. Each dynamic processing memory core 420(*a-n*) may be able to execute different applications 170 simultaneously due to cross bar switch 410 enabling the sharing of data elements between dynamic processing memory cores 420(*a-n*).

In another example, dynamic processing memory configuration 400 may be able to build a model of an airplane without having to access additional dynamic processing memory configurations 400 and/or access memory positioned off-chip from dynamic processing memory configuration 400 and/or incorporate virtual memory. In such an example, first dynamic processing memory core 420*a* may calculate the force, pitch, roll, and turning angle of the airplane as the airplane travels along the flight path. The force, pitch, roll, and turning angle may be incorporated as a four-vector and may be calculated in parallel by incorporating the matrix multiply capabilities of each of the four vector cores included in first dynamic processing memory core 420*a*. Second dynamic processing memory core 420*b* may then determine the control surfaces of the airplane based on the values of the force, pitch, roll, and turning angle of the airplane at each point along the flight path. Second dynamic processing memory core 420*b* may determine the control surfaces by accessing the memory locations of the respective data elements for force, pitch, roll, and turning angle for each point along the flight path as stored in the dynamic memory block of first dynamic processing memory core 420*a*. Second dynamic processing memory core 420*b* may access the data elements for force, pitch, roll, and turning angle for each point along the flight path as stored in the dynamic memory block of first dynamic processing memory core 420*a* via cross-bar switch 410.

Thus, cross-bar switch 410 may enable an immense amount of data elements to be calculated by each dynamic processing memory core 420(*a-n*) and then executed by other dynamic processing memory cores 420(*a-n*) as those dynamic processing memory cores 420(*a-n*) execute subsequent memory instructions that depend on the data elements generated and stored by dynamic processing memory cores 420(*a-n*) executing previous memory instructions. The dynamic access of memory of each dynamic processing memory core 420(*a-n*) provided by cross-bar switch 410 may enable dynamic processing memory core configuration 400 to execute memory instructions and/or applications 170 in parallel without having the use of virtual memory and/or memory positioned off-chip from dynamic processing memory core configuration 400.

Dynamic processor memory core configuration 400 may execute applications 170 that include but are not limited to fast database search and match, deep learning, crypto currency mining, incorporating RAM as logic, scanline RAM interpolator with Z/alpha/stencil, graphics primitives other than points, lines, triangles, forward difference engine for mathematical and other function evaluation and/or any other capability that will be apparent to those skilled in the relevant art(s) without departing from the spirit and scope of the disclosure.

Dynamic Dual In-Line Memory Module (DIMM)

FIG. 5 is a block diagram of a dynamic DIMM 500 such that a plurality of dynamic processing memory cores 520(a-n), where n in is an integer equal to or greater than one, may be configured on dynamic DIMM 500 where dynamic DIMM may be positioned in a standard DIMM slot for a standard personal computer (PC). Dynamic DIMM 500 includes plurality of dynamic processing memory cores 520(a-n), a first DIMM connector 510a, a second DIMM connector 510b, and a DIMM interface 530. Dynamic DIMM 500 shares many similar features with dynamic processing memory computing device 100, dynamic processing memory core 200, and dynamic processing memory core configuration 400; therefore, only the differences between dynamic DIMM 500 and dynamic processing memory computing device 100, dynamic processing memory core 200, and dynamic processing memory core configuration 400 are to be discussed in further detail.

As noted above, plurality of dynamic processing memory cores 520(a-n) may be positioned on the single memory chip and incorporated into a DIMM to formulate dynamic DIMM 500. Dynamic DIMM 500 may be formulated such that standard DIMM 500 includes first DIMM connector 510a and second DIMM connector 510b. First DIMM connector 510a and second DIMM connector 510b may be structured such that first DIMM connector 510a and second DIMM connector 510b may be compatible with standard DIMM slots that are positioned in a standard PC. In doing so, first DIMM connector 510a may slide into a first standard DIMM slot of a standard PC and second DIMM connector 510b may slide into a second standard DIMM slot of a standard PC. Therefore, dynamic DIMM 500 may be positioned in a standard PC by simply sliding first DIMM connector 510a and second DIMM connector 510b into the corresponding standard DIMM slots of the standard PC thereby significantly upgrading the processing capabilities of the standard PC.

The standard PC includes a standard CPU. After dynamic MINIM 500 is positioned in the standard DIMM slots of the standard PC, the standard CPU of the standard PC may transition the DIMM from the memory storage device to the processing device by instructing dynamic DIMM 500 to execute the memory instructions requested by the configurable processor controllers of each dynamic processing memory core 520(a-n) included in dynamic DIMM 500. The standard CPU of the standard PC may also transition dynamic DIMM 500 from the processing device to the memory storage device by instructing dynamic DIMM 500 to not execute the memory instructions thereby terminating the computational processing of dynamic DIMM 500 and maintaining the memory storage provided by dynamic DIMM 500.

Rather than having to build a new computer to execute different applications 170 that require significant processing capability such as graphic applications 170, artificial intelligence application 170, database application 170 and so on, dynamic DIMM 500 may be compatible with the standard MINIM slots of the standard PC such that a user may simply replace the conventional DIMMs that are included in a standard PC with dynamic DIMMs 500 and thereby significantly increasing the processing capabilities of the standard PC without having to do build a new computer. In doing so, dynamic DIMM 500 may simply be slotted into the standard MINIM slots of the standard PC and then the standard CPU of the standard PC may determine whether dynamic DIMM 500 is to operate by incorporating the processing capabilities and the memory storage capabilities of dynamic processing memory cores 520(a-n) or to simply operate as a memory storage device.

Based on application 170, the standard CPU of the standard PC may determine whether dynamic DIMM 500 is operate with the processing capabilities and the memory storage capabilities of dynamic processing memory cores 520(a-n). For example, the standard CPU may determine that application 170 is an artificial intelligence application and thereby requires the processing capabilities and the memory storage capabilities of dynamic processing memory cores 520(a-n). The standard CPU of the standard PC may instruct dynamic MINIM 500 to initiate the processing capabilities and the memory storage capabilities of dynamic processing memory cores 520(a-n) via interface 530 of dynamic DIMM 500. In doing so, the configurable processor controllers of processing memory cores 520(a-n) may initiate the parallel processing capabilities of each dynamic processing memory core 520(a-n) to execute the artificial intelligence application 170.

The standard CPU of the standard PC may also determine that application 170 does not require the processing capabilities of processing memory cores 520(a-n). In doing so, the standard CPU of the standard PC may instruct dynamic DIMM 500 to terminate the processing capabilities of dynamic processing memory cores 520(a-n) via interface 530 of dynamic DIMM 500. In doing so, dynamic processing memory cores 520(a-n) simply operate as memory storage devices where the standard CPU of the standard PC may access the memory locations of dynamic processing memory cores 520(a-n) to access and/or store data elements in regard to executing application 170. The configurable processor controllers of processing memory cores 520(a-n) may compress and/or decompress data elements are required to execute application 170. However, the processing capabilities of dynamic processing memory cores 520(a-n) may not be initiated thereby allowing dynamic processing memory cores 520(a-n) to simply operate as memory storage devices. In an embodiment, the CPU of each dynamic processing memory core 520(a-n) may instruct dynamic DIMM 500 as how to operate. In an embodiment, the configurable processor controllers 520(a-n) may instruct dynamic DIMM 500 as how to operate. Thus, dynamic DIMM 500 may upgrade a standard PC by simply being slotted into the standard DIMM slots thereby significantly increasing the processing capabilities of the standard PC.

The foregoing description of the specific embodiments will fully reveal the general nature of the present invention that others may, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on teaching and guidance presented herein. It is to be understood that the phraseology or terminology herein is for the purpose of description and not limitation, such that the terminology or phraseology of the specification is to be interpreted by the skilled artisan in light of the teachings and guidance.

The breadth and scope of the present invention should not be limited by any of the above-described exemplary embodiments, but should be defined only in accordance with the claims and their equivalence.

What is claimed is:

1. A system that incorporates a dynamic processing memory core onto a single memory chip to enable computational processing and memory storage from the single memory chip, comprising:
   at least one memory storage device included in the dynamic processing memory core and positioned on the single memory chip and configured to store a plurality of data elements with each data element stored at a memory location associated with the at least one memory storage device positioned on the single memory chip;
   at least one processing device included in the dynamic processing memory core and positioned on the single memory chip and configured to execute a plurality of memory instructions with each memory instruction associated with corresponding data elements that are stored in corresponding memory locations associated with the at least one memory storage device;
   a configurable processor controller configured to:
      transition the dynamic processing memory core from a memory storage device to a processing device by instructing the at least one processing device to execute at least one memory instruction that the at least one processing device is to execute based on a memory location of the data elements that are associated with the at least one memory storage device,
      determine whether a first set of memory instructions included in the plurality of memory instructions require an execution of the first set of memory instructions to be executed in parallel,
      automatically transition a Central Processing Unit (CPU) as positioned on the single memory chip with a plurality of vector cores positioned on the single memory chip to execute the first set of memory instructions, wherein the CPU executes the first set of memory instructions without implementing the plurality of vector cores to execute the first set of memory instructions in parallel thereby operating as the CPU in response to the first set of memory instructions not requiring execution in parallel,
      determine whether a second set of memory instructions included in the plurality of memory instructions require an execution of the second set of memory instructions to be executed in parallel to execute a graphics operation,
      automatically transition the plurality of vector cores to execute a corresponding memory instruction from the second set of memory instructions in parallel to execute the graphics operation as an extension of the CPU thereby enabling the plurality of vector cores operating as the extension of the CPU to operate as a Graphics Processing Unit (GPU) to execute the graphics operation, and
      transition the dynamic processing memory core from the processing device to the memory storage device by instructing the at least one processing device to not execute the memory instructions thereby terminating the computational processing of the dynamic processing memory core and maintaining the memory storage provided by the at least one memory storage device.

2. The system of claim 1, wherein the configurable processor controller is further configured to determine whether each data element is to be compressed when stored in each corresponding memory location associated with the at least one memory storage device and whether each data element is to be decompressed when executed by the at least one processing device.

3. The system of claim 1, wherein the at least one processing device comprises:
   at least one vector processor configured to interact with the configurable processor controller to determine the memory instructions the at least one processing device is to execute; and
   execute the memory instructions that the configurable processor controller requests the at least one processing device to execute in parallel.

4. The system of claim 3, wherein the at least one vector processor is configured to interpolate between a first data element and a second data element to determine a plurality of interpolated data elements that are between the first data element and the second data element thereby enabling the at least one vector processor to function as an interpolator.

5. The system of claim 4, wherein the at least one vector processor is further configured to:
   receive the first data element with a first value and the second data element with a second value from the corresponding memory locations that the first data element and the second data element are stored in the at least one memory storage device per the at least one memory instruction that the at least one processing device is to execute as requested by the configurable processor controller;
   execute an interpolation operation to generate a linear line and a gradient between the first data element and the second data element to interpolate between the first data element and the second data element;
   determine a plurality of interpolated data elements that are data elements with corresponding values that are between the first value of the first data element and the second value of the second data element as generated from the interpolation between the first data element and the second data element; and
   store the plurality of interpolated data elements with the corresponding values in corresponding memory locations in the at least one memory storage device per the at least one memory instruction requested to be executed by the configurable processor controller.

6. The system of claim 4, wherein the at least one vector processor comprises:
   a plurality of vector cores with each vector core configured to:
      interpolate between a corresponding first data element and a corresponding second data element associated with a corresponding vector as included in the memory instructions that the configurable processor controller requests the at least one processing device to execute in parallel, wherein each vector is associated with a corresponding component of the memory instructions that the at least one processing device is to execute, and
      execute the interpolation between each of the corresponding first data elements and the corresponding second data elements for each corresponding vector in parallel thereby executing an interpolation for each corresponding component of the memory instructions in parallel to thereby operate as a four vector processor.

7. The system of claim 1, wherein the dynamic processing memory core is incorporated as a dual in-line memory module (DIMM) and the configurable processor controller is further configured to:
- transition the DIMM from the memory storage device to a processing device by instructing the DIMM to execute the at least one memory instruction that the at least one processing device is to execute; and
- transition the DIMM from the processing device to the memory storage device by instructing the DIMM to not execute the memory instructions thereby terminating the computational processing of the DIMM and maintaining the memory storage provided by the DIMM.

8. A method for incorporating a dynamic processing memory core into a single memory chip to enable computational processing and memory storage from the single memory chip, comprising:
- storing a plurality of data elements with each data element stored at a memory location associated with at least one memory storage device positioned on the single memory chip, wherein the at least one memory storage device is included in the dynamic processing memory core and is positioned on the single memory chip;
- executing, by at least one processing device, a plurality of memory instructions with each memory instruction associated with corresponding data elements that are stored in corresponding memory locations associated with the at least one memory storage device, wherein the at least one processing device is included in the dynamic processing memory core and is positioned on the single memory chip;
- transitioning, by a configurable processor controller, the dynamic memory processing core from a memory storage device to a processing device by instructing the at least one processing device to execute at least one memory instruction that the at least one processing device is to execute based on a memory location of the data elements that are associated with the at least one memory storage device;
- determining whether a first set of memory instructions included in the plurality of memory instructions require an extension of the first set of memory instructions to be executed in parallel;
- automatically transitioning a Central Processing Unit (CPU) as positioned on the single memory chip with a plurality of vector cores positioned on the single memory chip, wherein the CPU executes the first set of memory instructions without implementing the plurality of vector cores to execute the first set of memory instructions in parallel thereby operating as the CPU in response to the first set of memory instructions not requiring execution in parallel;
- determining whether a second set of memory instructions included in the plurality of memory instructions require an execution of the second set of memory instructions to be executed in parallel to execute a graphics operation;
- automatically transitioning the plurality of vector cores to execute a corresponding memory instruction from the second set of memory instructions in parallel to execute the graphics operation as an extension of the CPU thereby enabling the plurality of vector cores operating as the extension of the CPU to operate as a Graphics Processing Unit (GPU) to execute the graphics operation; and
- transitioning the dynamic processing memory core from the processing device to the memory storage device by instructing the at least one processing device to not execute the memory instructions thereby terminating the computational processing of the dynamic processing memory core and maintaining the memory storage provided by the at least one memory storage device.

9. The method of claim 8, further comprising:
- determining whether each data element is to be compressed when stored in each corresponding memory location associated with the at least one memory storage device and whether each data element is to be decompressed when executed by the at least one processing device.

10. The method of claim 8, further comprising:
- determining the memory instructions the at least one processing device is to execute by at least one vector processor interacting with the configurable processor controller; and
- executing the memory instructions that the configurable processor controller requests the at least one processing device is to execute in parallel.

11. The method of claim 10, further comprising:
- interpolating between a first data element and a second data element to determine a plurality of interpolated data elements that are between the first data element and the second data element thereby enabling the at least one vector processor to function as an interpolator.

12. The method of claim 11, further comprising:
- receiving the first data element with a first value and the second data element with a second value from the corresponding memory locations that the first data element and the second data element are stored in the at least one memory device per the at least one memory instruction that the configurable processor controller requests the at least one processing device to execute;
- executing an interpolation operation to generate a linear line and a gradient between the first data element and the second data element to interpolate between the first data element and the second data element;
- determining a plurality of interpolated data elements that are data elements with corresponding values between the first value of the first data element and the second value of the second data element as generated by the interpolation between the first data element and the second data element; and
- storing the plurality of interpolated data elements with the corresponding values in corresponding memory locations in the at least one memory device per the at least one memory instruction requested to be executed by the configurable processor controller.

13. The method of claim 11, further comprising:
- interpolating, by a vector core, between a corresponding first data element and a corresponding second data element associated with a corresponding vector as included in the memory instructions that the configurable processor controller requests the at least one processing device to execute in parallel; and
- executing the interpolation between the corresponding first data element and the corresponding second data element for each corresponding vector in parallel thereby executing an interpolation for each corresponding component of the memory instructions in parallel to thereby using a plurality of cores to operate a four vector processor.

14. The method of claim 8, further comprising:
- transitioning, by the configurable processor controller, a dual in-line memory module (DIMM) from the memory storage device to a processing device by instructing the DIMM to execute the at least one memory instruction that the at least one processing device is to execute, wherein the dynamic memory processing core is incorporated as the DIMM; and transitioning the DIMM from the processing device to the memory storage device by instructing the DIMM to not execute the memory instructions thereby terminating the computational processing of the DIMM and maintaining the memory storage provided by the DIMM.

15. A system that enables computational processing and memory storage to be executed from a single memory chip, comprising:

a plurality of dynamic processing memory cores positioned on the single memory chip and configured to store a plurality of data elements in a plurality of memory storage devices included in the dynamic processing memory cores and execute a plurality of memory instructions by a plurality of processing devices included in the dynamic processing memory cores; and a plurality of configurable processor controllers with each configurable processor controller configured to:

instruct each corresponding dynamic processing core to operate as a memory storage device or a processing device by instructing each corresponding dynamic processing memory core to operate as a processing device to execute corresponding memory instructions thereby transitioning the dynamic memory cores into processing devices or by instructing dynamic processing memory cores selected to operate as memory storage devices to refrain from executing memory instructions thereby maintaining the memory storage of the selected dynamic processing memory cores, determine whether a first set of memory instructions included in the plurality of memory instructions require an execution of the first set of memory instructions to be executed in parallel, automatically transition a Central Processing Unit (CPU) as positioned on the single memory chip with a plurality of vector cores positioned on the single memory chip to execute the first set of memory instructions, wherein the CPU executes the first set of memory instructions without implementing the plurality of vector cores to execute the first set of memory instructions in parallel thereby operating as the CPU in response to the first set of memory instructions not requiring execution in parallel, determine whether a second set of memory instructions included in the plurality of memory instructions require an execution of the second set of memory instructions to be executed in parallel to execute a graphics operation, and automatically transition the plurality of vector cores to execute a corresponding memory instruction from the second set of memory instructions in parallel to execute the graphics operation as an extension of the CPU thereby enabling the plurality of vector cores operating as the extension of the CPU to operate as a Graphics Processing Unit (GPU) to execute the graphics operation.

16. The system of claim 15, further comprising:

a crossbar switch coupled to each dynamic processing memory core and configured to enable each dynamic processing memory core to share data elements with each other dynamic processing memory core and to access each memory storage device included in each dynamic processing memory core as instructed by the configurable processor controllers.

17. The system of claim 16, wherein each configurable processor controller is further configured to:

determine the plurality of memory instructions that each dynamic processing memory core is to execute, wherein each plurality of memory instructions includes a plurality of data elements to be incorporated into the execution of each plurality of memory instructions;

instruct each dynamic processing memory core as to each plurality of data elements that is to be shared between each corresponding dynamic processing memory core in each dynamic processing memory core executing each corresponding plurality of memory instructions, wherein each plurality of data elements is shared between each corresponding dynamic processing memory core via the crossbar switch.

18. The system of claim 17, wherein each configurable processor controller is further configured to initialize the plurality of dynamic processing memory cores to execute each corresponding plurality of memory instructions in parallel based on the sharing of the data elements required by each corresponding dynamic processing memory core to execute each corresponding plurality of memory instructions via the crossbar switch.

19. The system of claim 18, wherein each configurable processor controller is further configured to determine whether each data element is to be compressed or decompressed when shared between dynamic processing memory cores via the crossbar switch.

20. The system of claim 15, wherein the plurality of dynamic processing memory cores positioned on the single memory chip is incorporated as a dual in-line memory module (DIMM) and each configurable processor controller is further configured to:

transition the DIMM from the memory storage device as initially instructed by a corresponding configurable processor controller from the plurality of configurable processor controllers to transition from operating as the memory storage device to the processing device by instructing the DIMM to execute the memory instructions requested by the corresponding configurable processor controller; and transition the DIMM from the processing device as initially instructed by the corresponding configurable processor controller from the plurality of configurable processor controllers to transition from operating as the processing device to the memory storage device as instructed by the corresponding configurable processor controller by instructing the DIMM to not execute the memory instructions thereby terminating the computational processing of the DIMM and maintaining the memory storage provided by the DIMM.

\* \* \* \* \*